(12) United States Patent
Botero et al.

(10) Patent No.: US 11,679,907 B2
(45) Date of Patent: Jun. 20, 2023

(54) MULTILAYER SINGLE-DOSE EASY OPEN BOTTLE WITH PE/PET/PP CONFIGURATION AND PRE-CUT TOP

(71) Applicants: John Alexander Botero, Manizalez-Caldas (CO); Lukas Robledo Martinez, Manizalez-Caldas (CO)

(72) Inventors: John Alexander Botero, Manizalez-Caldas (CO); Lukas Robledo Martinez, Manizalez-Caldas (CO)

( * ) Notice: Subject to any disclaimer, the term of this patent is extended or adjusted under 35 U.S.C. 154(b) by 120 days.

(21) Appl. No.: 17/416,819

(22) PCT Filed: Dec. 18, 2019

(86) PCT No.: PCT/CO2019/000016
§ 371 (c)(1),
(2) Date: Jun. 21, 2021

(87) PCT Pub. No.: WO2020/125819
PCT Pub. Date: Jun. 25, 2020

(65) Prior Publication Data
US 2022/0081148 A1    Mar. 17, 2022

(30) Foreign Application Priority Data
Dec. 21, 2018   (CO) ........................ NC2018/0014032

(51) Int. Cl.
*B65D 1/02* (2006.01)
*B65D 17/28* (2006.01)
*B32B 1/02* (2006.01)
*B32B 27/08* (2006.01)
(Continued)

(52) U.S. Cl.
CPC .............. *B65D 1/0215* (2013.01); *B32B 1/02* (2013.01); *B32B 27/08* (2013.01); *B32B 27/32* (2013.01);
(Continued)

(58) Field of Classification Search
CPC ........ B65D 1/0215; B65D 1/02; B65D 17/28; B65D 75/5811; B65D 2221/00;
(Continued)

(56) References Cited

U.S. PATENT DOCUMENTS 3,727,803 A * 4/1973 Cobb .................. B65D 1/0292
222/215
3,993,223 A * 11/1976 Welker, III ............ B65D 35/08
222/541.9
(Continued)

FOREIGN PATENT DOCUMENTS

| EP | 1746043 A1 | 1/2007 |
| EP | 2354034 A1 | 8/2011 |
| EP | 2433788 A1 | 3/2012 |

*Primary Examiner* — Ernesto A Grano
(74) *Attorney, Agent, or Firm* — Albert Bordas, P.A.

(57) ABSTRACT

In the alcohol market or in the liquor industries, it is common to find that the packaging activity is carried out in glass bottles and on some occasions in PET (POLYETHYLENE TEREPHALATE) and PP (POLYPROPYLENE) type containers. In the case of these latter packages, there are problems of conservation of quality, aroma and flavor, since they give off particles because they are not completely resistant to alcohol. Now, glass bottles are the most used since thanks to their 10 barrier property they preserve the flavor and quality of these kinds of drinks for longer, maintaining the level of alcohol, aroma and flavor from bottling but having serious transport and packaging problems.

The present invention provides a bottle of a new multilayer material in 15 that is packaged in a smaller dose than conventional ones, also called single-dose liquor or spirits, in which the preservation of the liquor is guaranteed for a prolonged period thanks to the incorporation of a technical solution that does not allow the release of particles in the drink for up to 27 months. Likewise, the new bottle has an easy open system that allows guaranteeing the non-reuse of the packaging to pack adulterated liquor, which is a frequent problem in the liquor industry.

6 Claims, 3 Drawing Sheets

(51) Int. Cl.
 *B32B 27/32* (2006.01)
 *B32B 27/36* (2006.01)
(52) U.S. Cl.
 CPC .............. *B32B 27/36* (2013.01); *B65D 17/28* (2018.01); *B32B 2250/03* (2013.01); *B32B 2250/24* (2013.01); *B32B 2307/732* (2013.01); *B32B 2439/60* (2013.01)
(58) Field of Classification Search
 CPC ........... B32B 1/02; B32B 27/08; B32B 27/32; B32B 27/36; B32B 2250/40; B32B 2439/60
 See application file for complete search history.

(56) References Cited

U.S. PATENT DOCUMENTS

| | | | | |
|---|---|---|---|---|
| 6,343,717 | B1* | 2/2002 | Zhang | A61J 1/065 222/541.6 |
| 6,666,359 | B2* | 12/2003 | Lau | B65B 9/042 604/257 |
| 8,377,029 | B2* | 2/2013 | Nagao | B65D 1/095 220/255 |
| 2005/0006385 | A1* | 1/2005 | D'Amato | B65D 3/22 220/62 |
| 2005/0123724 | A1 | 6/2005 | Blanchard | |
| 2010/0320206 | A1* | 12/2010 | Caldwell | B65D 85/72 220/266 |
| 2011/0120902 | A1 | 5/2011 | Boswell et al. | |
| 2012/0205373 | A1 | 8/2012 | Caldwell | |
| 2014/0048505 | A1 | 2/2014 | Altus et al. | |
| 2015/0093477 | A1 | 4/2015 | McNamara | |
| 2020/0122898 | A1* | 4/2020 | Ikeda | B65D 35/08 |

* cited by examiner

MULTILAYER SINGLE-DOSE EASY OPEN BOTTLE WITH PE/PET/PP CONFIGURATION AND PRE-CUT TOP

BRIEF DESCRIPTION OF THE DRAWINGS

To complement the description that is being made and in order to help a better understanding of the characteristics of the invention, a set of drawings is attached as an integral part of said description, in which, with an illustrative and non-limiting nature, the following has been represented.

DESCRIPTION OF THE PARTS

Figure 1:
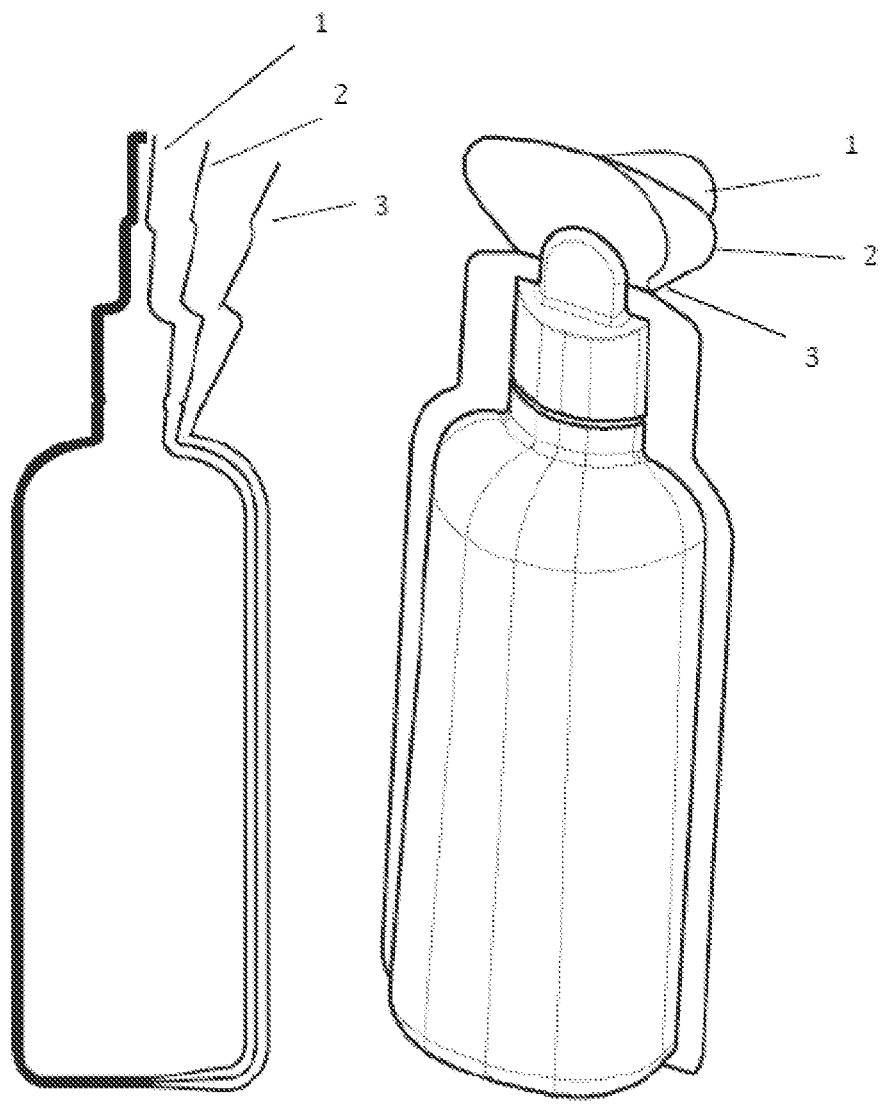
FIG. 1: Arrangement of the three layers of the material of the new bottle.
Figure 2:
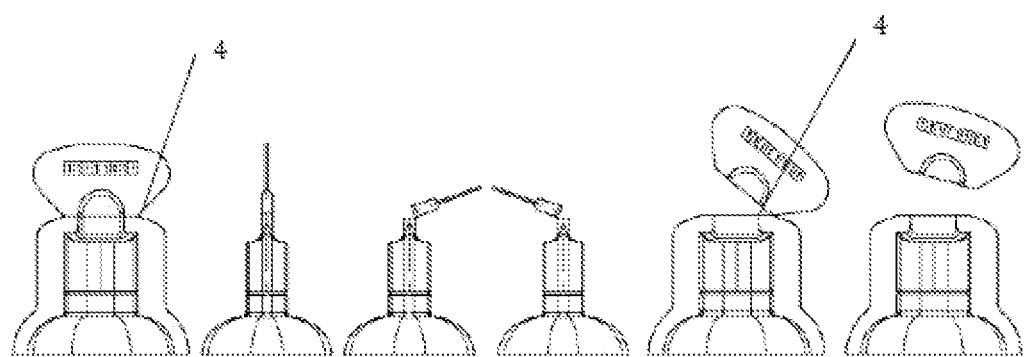
FIG. 2: Pre-cut the top of the bottle to allow easy opening of the bottle.

1. First PE layer of polyethylene known as Polyethylene blown film
2. Second layer, polyethylene terephthalate PET known as Poly ethylene terephthalate
3. Third and last layer, PP Polypropylene known as cast polypropylene film
4. Upper precut to allow opening of the bottle
5. Indent in the base of the bottle

PREFERRED EMBODIMENT OF THE INVENTION

The present invention consists of the following parts
A first PE layer (1) of polyethylene known as Polyethylene blown film
A second layer, PET (2) of polyethylene terephthalate known as Poly ethylene terephthalate
A third and final layer, PP (3) Polypropylene known as cast polypropylene film
An upper pre-cut (4) to allow the opening of the bottle
An indentation in the base of the bottle (5)
An upper pre-cut (4) to allow the opening of the bottle The present invention provides a new bottle with a new material for the packaging of alcoholic beverages in single-dose presentation in which the material of the invention is composed of 3 layers arranged in a specific order which have functions within the invention and together they produce a unique and new effect not previously known in the state of the art.

These layers have the function of a cava for liqueurs, due to the properties of their material, that is to say that the liquor through the new material revealed creates a dark chamber in which the alcohol packed there is preserved intact.

The first layer, PE (1) of polyethylene known as Polyethylene blown film is characterized by preventing the detachment of particles and contamination of the alcoholic beverage, this layer prevents the change of flavor of the liquor and is the inner layer that is in direct contact with the drink, the polyethylene is characterized for having a high chemical resistance which allows it not to be attacked or affected by alcohol.

The second layer, PET (2) of polyethylene terephthalate known as Polyethylene terephthalate acts as a barrier against light, prevents it from evaporating and losing the alcohol in the alcoholic beverage, it is also the layer that provides the bottle with firmness and stability to allow its resistance and to remain standing.

The third and last layer, PP (3) Polypropylene known as cast polypropylene film, has a thermal resistance at high temperatures and being the outermost layer provides extra protection against thermal changes, also due to its exterior and interior texture it lends itself to the printing of the high-resolution product labeling, where said printing is mirror-like, that is, it is printed on the inner face of this last layer, which prevents detachment and color change due to the product rubbing against other surfaces. This last layer also has an attachment type 25038-59-9 that protects alcohol or drink from ultraviolet rays, making the material resistant to light. This light protective pigment can be EU: 201-375-5.

The layers of the invention have a total sum of 330 microns, where PE (1) has a dimension of 250 microns, PET (2) a dimension of 50 microns and PP (3) a dimension of 30 microns, in which each thickness is determined by the function that each one fulfills for the preservation of the alcoholic beverage.

In another embodiment of the invention it is observed that the layers of PE (1), PET (2), and PP (3) material can have the following thicknesses: a) 300, 50, 30 b) 25 300, 55, 35 or c) 430, 55 and 40 microns, respectively.

Likewise, said combination of layers in which PE (1) can be CAS 9002-88-4, PET (2) can be CAS 25038-59-9, and PP (2) can be CAS 9003-07-0 as a result a new material.

The duration of the alcoholic beverage has been demonstrated through laboratory stability studies supported by the ONAC (National Accreditation Body of Colombia) in which an accelerated aging test was carried out in which the speed of physical decomposition is increased and/or chemistry of the product by creating environmental conditions of extreme conservation to determine the physical decomposition time taking into account the type of material and the content, and identify the kinetic parameters of the decomposition processes and predict the useful life of the product under conditions of normal storage.

The accelerated stability study was carried out on samples of the product in the bottle of the invention, single-dose bottles, specifically with Aguardiente and Rum liquor from the Industria Licorera de Caldas.

The accelerated stability study was carried out by applying an extreme temperature of 40° C.+2° C. and RH 75%+5% relative humidity to the samples, according to the following table:

| Time (days) | Storage conditions 40° C. ± 2° C. and RH 75% ± 5% | Date |
| --- | --- | --- |
| 0 | Sample evaluated at the start of the study, after 0 days | 2018 Jul. 27 |
| 10 | Sample evaluated after 10 days | 2018 Aug. 6 |
| 20 | Sample evaluated after 20 days | 2018 Aug. 16 |
| 31 | Sample evaluated after 31 days | 2018 Aug. 27 |

Likewise, a natural stability study was carried out before and after study on the samples stored at temperatures of 25° C.+2° C. and 60%+5% relative humidity:

| Time (days) | Storage conditions 25° C. ± 2° C. and RH 60% ± 5% | Date |
| --- | --- | --- |
| 0 | Sample evaluated at the start of the study, after 0 days | 2018 Jul. 27 |
| 31 | Sample evaluated after 31 days | 2018 Aug. 27 |

The aspects to be evaluated were the physicochemicals of the alcohol throughout the study time, the organoleptic or sensory aspects such as the appearance, color, odor throughout the study time.

| TIME IN CAMERA (Days) | DATE | ATTRIBUTE | | | | REMARKS |
|---|---|---|---|---|---|---|
| | | APPEARANCE/ TEXTURE | ODOR | COLOR | FLAVOR | |
| 0 | 2018 Jul. 27 | 8 | 8 | 8 | N.A | It is taken as a reference sample to evaluate the sensory characteristics of the product in the rest of the stability times. |
| 10 | 2018 Aug. 6 | 8 | 8 | 8 | N.A | The sensory characteristics of appearance, color and odor do not show significant changes compared to the Reference product. |
| 20 | 2018 Aug. 16 | 8 | 8 | 8 | N.A | The sensory characteristics of appearance, color and odor do not show significant changes compared to the Reference product. |
| 31 | 2018 Aug. 27 | 8 | 8 | 8 | N.A | The sensory characteristics of appearance, color and odor do not show significant changes compared to the Reference product. |
| 31 Natural | 2018 Aug. 27 | 8 | 8 | 8 | N.A | The sensory characteristics of appearance, color and odor do not show significant changes compared to the Reference product. |

START DATE: 2018 Jul. 27

APPEARANCE:
6-8 Very similar to reference
3-5 Medium similar
0-2 slightly similar to reference Color:
6-8 similar to reference
3-5 Medium similar to reference
0-2 slightly similar to reference Taste:
6-8 similar to reference
3-5 Medium similar to reference
0-2 slightly similar to reference Odor:
6-8 similar to reference
3-5 Medium similar to reference
0-2 slightly similar to reference Decision criterion: with an average score lower than 5, the accelerated stability storage time is suspended and with this time the projection is made Decision criterion: with an average score lower than 5, the accelerated stability storage time is suspended and with this time the projection is made.

Where 8 is the maximum rating against possible variations, which indicates that the product does not suffer alterations in its physicochemical characteristics.

The result of the analysis shows that when faced with extreme temperatures, the composition of the single-dose bottle of the invention did not significantly alter the quality of the product or alcoholic beverage housed in it.

Against the projection of the useful life in terms of accelerated aging conditions of 40° C.+2° C. and RH 75%+5%, characteristics such as alcoholic degree were evaluated, in 2. Data Projection and Analysis
Evaluated Parameter: Alcoholic Degree

| Storage time (Days) | Alcoholic degree Minimum 35.0% |
|---|---|
| 0 | 36.76 |
| 10 | 36.20 |
| 20 | 36.15 |
| 31 | 35.82 |

Simple Regression—Alcoholic Grade vs. Time

Dependent Variable: Alcoholic Grade Independent Variable:

Linear Time: $Y = a + b*X$

STUDY START DATE: 2018 Jul. 27
STORAGE CONDITIONS: 40° C. ± 2° C. AND 75% ± 5% RH

| TIME (Days) | EVALUATION DATE | Organoleptic Characteristics | | | Physicochemical analysis Alcoholic degree |
|---|---|---|---|---|---|
| | | Appearance | Color | Odor | Minimum 35.0% |
| 0 | 2018 Jul. 31 | Translucent liquid, homogeneous, free of foreign particles | Yellow | Product characteristics | 36.76 |
| 10 | 2018 Aug. 6 | Translucent liquid, homogeneous, free of foreign particles | Yellow | Product characteristics | 36.20 |
| 20 | 2018 Aug. 16 | Translucent liquid, homogeneous, free of foreign particles | Yellow | Product characteristics | 36.15 |
| 31 | 2018 Aug. 27 | Translucent liquid, homogeneous, free of foreign particles | Yellow | Product characteristics | 35.82 |
| 31 Natural 25° C. ± 2° C. and 60% ± 5% RH | 2018 Aug. 27 | Translucent liquid, homogeneous, free of foreign particles | Yellow | Product characteristics | 36.60 |

*According to the Standard: Specifications provided by the customer
[1]Methods accredited by ONAC Certificate of Accreditation 10-LAB-053 Renewal Date 2014 Sep. 5 Under ISO/IEC 17025: 200 Standard Coefficients

| Parameter | Minimum Squared Estimated | Standard Error | Statistical T | Value-P |
|---|---|---|---|---|
| Intercept | 36.663 | 0.124702 | 294.006 | 0 |
| Slope | −0.0287 | 0.00666558 | −4.3057 | 0.0499 |

Variance Analysis

| Source | Sum of Squares | Gl | Middle Square | Reason-F | Value-P |
|---|---|---|---|---|---|
| Model | 0.411845 | 1 | 0.411845 | 18.54 | 0.0499 |
| Residual | 0.04443 | 2 | 0.022215 | | |
| Total (Corr.) | 0.456275 | 3 | | | |

Correlation Coefficient=−0.950066
R-squared=90.2625 percent
R-squared (adjusted for g.l.)=85.3937 percent
Standard error of the est.=0.149047
Mean absolute error=0.088
Durbin-Watson statistic=2.98328 (p=0.6907)
Auto correlation of residuals in lag 1=−0.60117

Figure 5:
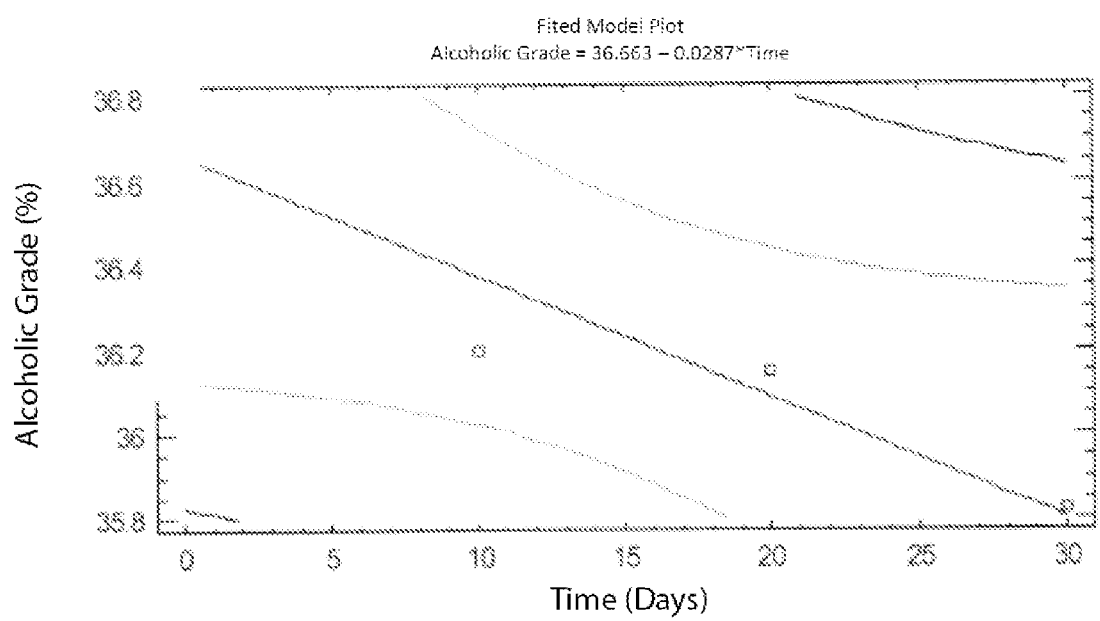
FIG. 5: Graphic showing the relationship between alcoholic strength and time.

As seen in FIG. 5, the output shows the results of fitting a linear model to describe the relationship between alcoholic strength and time. The equation of m tight model is Alcoholic degree=36.663−0.0287*time Since the −P value in the ANOVA table is less than 0.05, there is a statistically significant relationship between alcoholic strength and time with a 95% confidence level.

The R-Squared statistic indicates that the adjusted model explains 90.2625% of the variability in Alcoholic Grade. The correlation coefficient is equal to −0.950066 indicating a relatively strong relationship between the variables.

Predicted Values

| X | Predictions Y | 95.00% Limit Lower | Prediction Upper | 95.00% Limit Lower | Confidence Upper |
|---|---|---|---|---|---|
| 0 | 36.663 | 35.8269 | 37.4991 | 36.1265 | 37.1995 |
| 30 | 35.802 | 34.9659 | 36.6381 | 35.2655 | 36.3385 |
| 57 | 35.0271 | 33.6253 | 36.4289 | 33.7806 | 36.2736 |
| 58 | 34.9984 | 33.5719 | 36.4249 | 33.7242 | 36.2726 |

This table shows the predicted values for Alcoholic Grade using a fitted model. In addition to the best predictions, the table shows:

(1) 95.0% forecast intervals for new observations
(2) 95% confidence intervals for the mean of several observations The prediction and confidence intervals correspond to the internal and external bounds on the graph of the fitted model.

As a result, the study carried out by the laboratory indicated that the product, under normal conditions of temperature and relative humidity, remained without significant modifications compared to the sensory and physicochemical characteristics evaluated.

During the accelerator study of extreme conditions of temperature and relative humidity, the product maintains the evaluated quality characteristics within specifications; sensory characteristics such as color, smell and appearance were monitored. The alcoholic degree was taken as an indicator to make the calculation of the projection of the useful life time, as it is a priority condition for this type of products, which remained within the established specification.

In conclusion, taking into account the stability of the formulation, both from the sensory and physicochemical point of view, a shelf life of 27 months and a reliability of 95% is established for the product in the bottle of the invention provided that the product remains in the bottle and it is not damaged or altered, that is, as long as it is not opened and the alcoholic beverage is packaged in a bottle with the new multilayer material used in the accelerated stability study.

Another study carried out on the invention is the technical test of global and specific migration, which is required by INVIMA for the material to be accepted to accommodate liquid or solid content that is for human consumption.

In this global and specific migration test, the presence of metals and acids is measured on the tested material, in this case the multilayer material of the bottle of the invention. These laboratory tests determined that the material of the invention complies with the limits of global migration and specific migration of metals (Barium, Cobalt, Copper, Iron, Lithium, Manganese, Zinc, Aluminum, Nickel), antimony trioxide, monoethylene glycol, diethylene glycol, terephthalic acid, isophthalic acid, acetaldehyde, 1-hexene and 1-octene established in Commission Regulation (EU) No. 10/2011 of Jan. 14, 2011, on plastic materials and objects intended to come into contact with food for the simulant tested under the exposure conditions evaluated and consequently complying with the analysis of toxicological risks due to migration of packaging material to the product; according to the provisions of Article 32, Decree 1686 of 2012 and Resolution No. 683 of 2012, according to the tests of certified Colombian and European laboratories, it was determined that the packaging complies with these parameters and is suitable for human consumption.

Specifically, the migration study for single-dose bottle of the new PE/PET/PP three-layer composite material indicated:

SAMPLE: 1 LAMINATED SINGLE-DOSE CONTAINER OF 3 LAYERS PE/PET/PP RON VIEJO DE CALDAS. AGUARDIENTE XS. AGUARDIENTES AND AGUARDIENTE L. Taker: customer. Units: 1. Product: packaging materials

| Assays | Result | Units |
|---|---|---|
| Cadmium * | <0.25 | mg/kg |
| PAQ015ICP-AES | | |
| Lead * | <0.75 | mg/kg |
| PAQ015 ICP-AES | | |
| Mercury * | <0.75 | mg/kg |
| PAQ015 ICP-AES | | |
| Chromium * | <0.75 | mg/kg |
| PAQ015 ICP-AES | | |
| Global migration in ethanol 50% (v/v) | | |
| UNE-EN 1186 Gravimetry | | |
| Rule | UNE-EN 1186-9 | |
| Contact form | Filing | |
| Contact surface ratio | 16.4 | dm2/Kg |
| Exposure temperature (T) | 40" C. | |
| Exposure time (t) | 10 days | |
| Replica 1 | <1.3 | mg/dm$^2$ |
| Replica 2 | <1.3 | mg/dm$^2$ |
| Replica 3 | <1.3 | mg/dm$^2$ |
| Average | <1.3 | mg/dm$^2$ |

Specific migration of 9 metals (Ba, Co, Cu, Fe, Li, Mn, Zn, Al, Ni) in 50% ethanol (v/v)*
PAQ385 ICP-MS

| Contact form *1 | Filing | |
|---|---|---|
| Contact surface/volume ratio * | 16.4 | dm$^2$/Kg |
| Exposure temperature (T) * | 60° C. | |
| Exposure time (T) * | 10 days | |
| Barium (Replica 1) * | <0.01 | mg/kg |
| Barium (Replica 2) * | <0.01 | mg/kg |
| Bathroom (Replica 3) * | <0.01 | mg/kg |
| Barium (Average) * | <0.01 | mg/kg |
| Cobalt (Replica 1) * | <0.005 | mg/kg |
| Cobalt (Replica 2) * | <0 005 | mg/kg |

-continued

| | | |
|---|---|---|
| Cobalt (Replica 3) * | <0.005 | mg/kg |
| Cobalt (Average) * | <0.005 | mg/kg |
| Copper (Replica 1) * | <0.10 | mg/kg |
| Copper (Replica 2) * | <0.10 | mg/kg |
| Copper (Replica 3) * | <0.10 | mg/kg |
| Copper (Average) * | <0.10 | mg/kg |
| Iron (Replica 1) * | <0.10 | mg/kg |
| Iron (Replica 2) * | <0.10 | mg/kg |
| Iron (Replica 3) * | <0.10 | mg/kg |
| Iron (Average) * | <0.10 | mg/kg |
| Lithium (Replica 1) * | <0.02 | mg/kg |
| Lithium (Replica 2) * | <0.02 | mg/kg |

SAMPLE: 1 LAMINATED SINGLE-DOSE CONTAINER OF 3 LAYERS PE/PET/PP RON VIEJO DE CALDAS, AGUARDIENTE XS. AGUARDIENTE S AND AGUARDIENTE L. Taker: customer. Units: L Product: packaging materials

| Assays | Result | Units |
|---|---|---|
| Lithium (Replica 3) * | <0.02 | mg/kg |
| Lithium (Average) * | <0.02 | mg/kg |
| Manganese (Replica 1) * | <0.05 | mg/kg |
| Manganese (Replica 2) * | <0.05 | mg/kg |
| Manganese (Replica 3) * | <0.05 | mg/kg |
| Manganese (Average) * | <0.05 | mg/kg |
| Zinc (Replica 1) * | <0.10 | mg/kg |
| Zinc (Replica 2) * | <0.10 | mg/kg |
| Zinc (Replica 3) * | <0.10 | mg/kg |
| Zinc (Average) * | <0.10 | mg/kg |
| Aluminum (Replica 1) * | <0.10 | mg/kg |
| Aluminum (Replica 2) * | <0.10 | mg/kg |
| Aluminum (Replica 3) * | <0.10 | mg/kg |
| Aluminum (Average) * | <0.10 | mg/kg |
| Nickel (Replica 1) * | <0.01 | mg/kg |
| Nickel (Replica 2) * | <0.01 | mg/kg |
| Nickel (Replica 3) * | <0.01 | mg/kg |
| Nickel (Average) * | <0.01 | mg/kg |
| Specific migration of antimony in ethanol 50% ethanol (v/v) * PAQ385 ICP-MS | | |
| Contact form * 1 | Filing | |
| Contact surface/volume ratio * | 16.4 * | dm²/Kg |
| Exposure temperature (T) * | 60" C. | |
| Exposure time * | 10 days | |
| Replica 1 * | <0.005 | mg/Kg |
| Replica 2 * | <0.005 | mg/Kg |
| Replica 3 * | <0.005 | mg/Kg |
| Average * | <0.005 | mg/Kg |
| Specific migration of monoethylene glycol and dieoleglycoi in ethanol 50% (v/v) * PAQ309 GC-FID | | |
| Contact form * 1 | Filing | |
| Contact surface/volume ratio * | 16.4 | dm2/Kg |
| Exposure temperature (T) * | 60° C. | |
| Exposure time (t) * | 10 days | |
| Monoetilenghcol replica 1 * | <3 | mg/Kg |
| Monoetilenghcol replica 2 * | <3 | mg/Kg |
| Monoetilenghcol replica 3 * | <3 | mg/Kg |
| Monoethylene glycol average * | <3 | mg/Kg |
| Dietilenghcol replica 1 * | <3 | mg/Kg |
| Oetilenghcol replica 2 * | <3 | mg/Kg |
| Dietilenghcol replica 3 * | <3 | mg/Kg |
| Dietilenghcol media * | <3 | mg/Kg |
| Mean sum mono and diethylene glycol * 2 | <6 | mg/Kg |
| Specific migration of terephthalic and isophthalic acid in ethanol 50% (v/v) * PAQ308 HPLC-PDA | | |
| Contact form * 1 | Filing | |
| Contact/volume surface ratio * | 16.4 | dm²/Kg |
| Exposure temperature (T) * | 60° C. | |
| Exposure time (t) * | 10 days | |

From these tests it follows that the migration levels comply with the European standard UNE-EN 13130-1 since the maximum allowed concentration of lead, cadmium, mercury and hexavalent chromium must not exceed 100 mg/kg in weight, and the tests show that the levels are almost imperceptible compared to the maximum allowed.

For plastic materials and objects, the maximum is 10 mg/dm2, maximum limits that are not revealed in the study either, since the values obtained are the following:

| Migration by material | Values |
|---|---|
| Barium | 1 mg/kg |
| Cobalt | 0.05 mg/kg |
| Copper | 5 mg/kg |
| Iron | 48 mg/kg |
| Lithium | 0.6 mg/kg |
| Manganese | 0.6 mg/kg |
| Zinc | 5 mg/kg |
| Aluminum | 1 mg/kg |
| Animonium (antimony) trioxide | 0.04 mg/kg |
| Monoethylene glycol and diethylene glycol | 30 mg/kg |
| Terephthalic acid | 7.5 mg/kg |
| Isophthalic acid | 5 mg/kg |
| acetaldehyde | 6 mg/kg |
| 1-hexene | 3 mg/kg |
| 1-Octene | 15 mg/kg |

In the same way, given these results on the study of global and specific migration, the Colombian control entity INVIMA approved the material as suitable for human consumption, differentiating it from the PET individually considered, establishing that this is a new material suitable for packaging products for human consumption.

So that the single-dose bottle built with the combination of the three PE/PET/PP layers, technically improves the conservation of the alcoholic beverages housed in it, likewise it keeps the drink isolated from the presence of metals such as barium, cobalt, copper, iron, lithium, manganese, zinc, aluminum, and acids.

The three layers are joined together under the lamination method, generating a single piece that is later simply bent, without cuts, or separate molds, but in a single mold and in a single sheet the shape is extruded and then injected with air and finally filled with the alcoholic drink.

The manufacturing steps of the bottle would be to take the three layers described, they are shaped, subsequently laminated, filled with liquid, stamped, sealed around the shape and the easy open that constitutes a pre-cut is located.

The base or lower part of the bottle, when formed in a single piece, has an oval-shaped indent (5) with an internal diameter whose measurement is 12 and 16 mm wide and between 14 and 20 mm long, and of The inner diameter dimensions are preferably 15 mm wide and 18 mm long.

In the formation of the container, greater hardness is observed in the layer of the upper part of the bottle, and in the lower part, the layer of the base of the bottle is thinner, because it expands in its formation.

This form of production generates a final technical effect on the bottle, which is to stand up, otherwise, if it were made up of two molds, its final shape would be a kind of flexible PET sachets or shampoo cushion.

Figure 3:
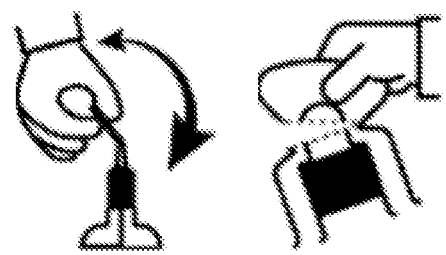
FIG. 3: Indication of bottle opening.
Figure 4:
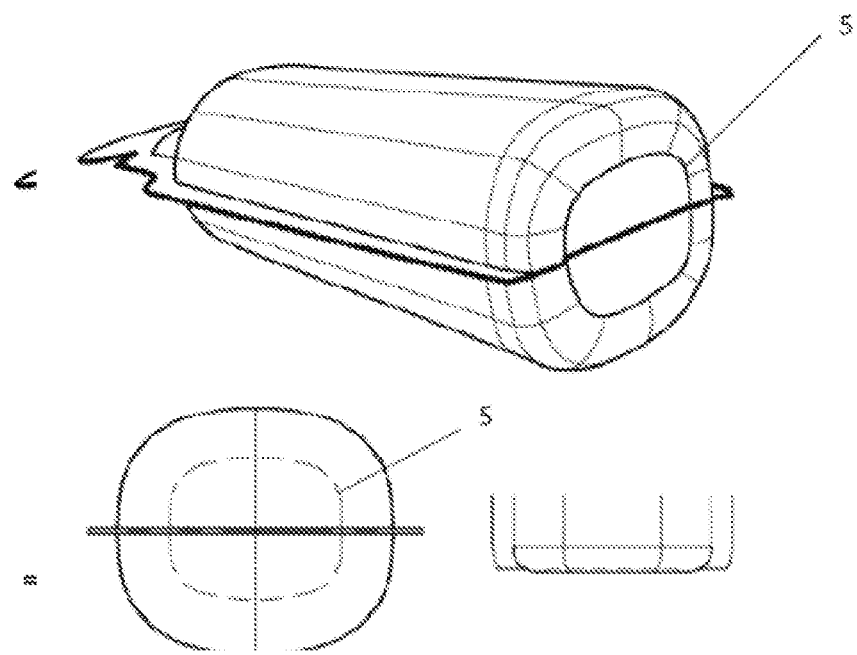
FIG. 4: Base of the bottle, in which the shape of the indentation is observed to allow it to stand up.

From another aspect of the invention, the revealed bottle has an easy-open system located at its upper end that consists of a pre-cut (4) with a drilling depth dimension of 0.3 mm and a length of 12 mm, which allows the consumer with three simple movements (FIG. 3) open the bottle, without the need to use a cutting element, the opening movements are forward, backward and a turn to the right in the form of a tear.

Once the cut of the upper part that emerges from the bottle to access the liquid has been made, it is observed that the bottle does not remain with burrs, but that it remains polished and without imperfections.

The invention claimed is:

1. Easy open multilayer single-dose bottle, comprising:
   A) a first layer (PE) (1) of polyethylene material located inside of the bottle, whereby the (PE) layer (1) comprises a thickness between 250 microns to 430 microns;
   B) a second PET layer (2) of polyethylene terephthalate located between the first and third layers, whereby the PET layer (2) comprises a thickness between 50 microns to 55 microns; and
   C) a third PP layer (3) of Polypropylene located outside the bottle, whereby PP layer (3) comprises a thickness between 30 microns to 40 microns, wherein the three layers are laminated to each other, wherein an upper part of the bottle has a pre-cut (4) and an oval indent (5) at a base of the bottle, the layer PP (3) contain an attachment of a pigment type EU: 201-375-5.

2. The bottle of claim 1, wherein the oval indent comprises an internal diameter measuring between 12 mm and 16 mm in width and between 14 mm and 20 mm in length.

3. The bottle of claim 1, wherein the oval indent comprises inner diameter dimensions of 15 mm wide and 18 mm long.

4. The bottle of claim 1, wherein the first PE layer (1) is CAS 9002-88-4, the second PET layer (2) is CAS 25038-59-9 and the third layer PP (3) is CAS 9003-07-0.

5. The bottle of claim 1, wherein the PE (1), PET (2), and PP (3) layers have thicknesses of 250 microns, 55 microns, and 30 microns, respectively.

6. The bottle of claim 1, wherein the upper precut (4) has a drilling depth dimension of 0.3 mm and a length of 12 mm.

* * * * *